US008144057B1

(12) United States Patent  
Minkoff (10) Patent No.: US 8,144,057 B1  
(45) Date of Patent: Mar. 27, 2012

(54) METHODS AND APPARATUS FOR ADAPTIVELY DETERMINING ANGLES OF ARRIVAL OF SIGNALS

(75) Inventor: John Minkoff, Englewood, NJ (US)

(73) Assignee: Exelis Inc., Wilmington, DE (US)

( * ) Notice: Subject to any disclaimer, the term of this patent is extended or adjusted under 35 U.S.C. 154(b) by 338 days.

(21) Appl. No.: 12/536,945

(22) Filed: Aug. 6, 2009

Related U.S. Application Data (60) Provisional application No. 61/121,601, filed on Dec. 11, 2008.

(51) Int. Cl.
*G01S 5/02* (2010.01)
*G01S 3/16* (2006.01)
*H01Q 3/00* (2006.01)

(52) U.S. Cl. ........ 342/423; 342/417; 342/422; 342/373; 342/377; 342/379

(58) Field of Classification Search .................. 342/423, 342/417, 422, 373, 377, 379
See application file for complete search history.

(56) References Cited

U.S. PATENT DOCUMENTS

| | | | |
|---|---|---|---|
| 5,615,175 A * | 3/1997 | Carter et al. ................ | 367/124 |
| 5,926,135 A | 7/1999 | Minkoff | |
| 5,926,405 A | 7/1999 | Minkoff | |
| 6,108,564 A | 8/2000 | Minkoff | |
| 6,252,540 B1 * | 6/2001 | Hale et al. ...................... | 342/159 |
| 6,912,323 B2 * | 6/2005 | Copeland et al. ............. | 382/279 |
| 7,026,989 B1 | 4/2006 | Minkoff et al. | |
| 7,183,974 B1 | 2/2007 | Minkoff | |
| 7,414,578 B1 * | 8/2008 | Courtade et al. .............. | 342/377 |
| 7,420,509 B2 | 9/2008 | Minkoff | |
| 7,751,854 B2 * | 7/2010 | Leifer et al. ................ | 455/562.1 |
| 2001/0051860 A1 * | 12/2001 | Copeland et al. ................ | 703/2 |
| 2008/0007454 A1 * | 1/2008 | Minkoff ........................ | 342/379 |

* cited by examiner

*Primary Examiner* — Thomas Tarcza
*Assistant Examiner* — Frank J McGue
(74) *Attorney, Agent, or Firm* — Edell, Shapiro & Finnan, LLC (57) ABSTRACT

A technique for determining the angles of arrival of signals incident on an antenna array from directions within an angular region of interest involves supplying outputs of antenna elements of the antenna array to a number of different weight generators. Each of the weight generators produces a set of beam-forming weights that maximizes a signal-to-interference ratio of a locally generated signal corresponding to a look angle that is outside the region of interest, with signals at different look angles being supplied to the different weight generators. An annihilation operator is determined from the sets of beam-forming weights generated by the weight generators and from beam-forming vectors representing the look angles of the locally generated signals used in the weight generators. The annihilation operator is applied to a group of beam-forming vectors representing angles within the region of interest to determine angles of arrival of signals within the region of interest.

20 Claims, 3 Drawing Sheets

METHODS AND APPARATUS FOR ADAPTIVELY DETERMINING ANGLES OF ARRIVAL OF SIGNALS

CROSS REFERENCE TO RELATED APPLICATION

This application claims priority from U.S. Provisional Patent Application Ser. No. 61/121,601 entitled "Adaptive Algebraic Interference Cancellation," filed Dec. 11, 2008. The disclosure of this provisional patent application is incorporated herein by reference in its entirety.

BACKGROUND

Recently, a new approach for eliminating interference at arrays has been presented that performs algebraic operations in which the interference, represented as vectors, is annihilated by a transformation into the zero vector. This represents a radically different approach from conventional methods commonly in use that employ beam-forming nulling (BFN). In such adaptive beam-forming (ABF) schemes, the interference is rejected by deliberately distorting the array beam pattern such that "nulls," regions of markedly reduced array gain, are placed at those angles corresponding to the interference directions, which null out the interference. With the distortion of the beam pattern, the process of rejecting interference is accompanied unavoidably by distortion of the output signal time functions of interest, a problem associated with this technique, well known and largely ignored since its inception, and there are numerous applications in which this is especially undesirable. In radio astronomy, for example in the search for extraterrestrial intelligence (SETI), or in observations of pulsars or bursts and transients, preserving the properties and structure of the received time functions is essential. In communications systems and other applications such as guidance systems or aircraft landing systems, where accurate phase information is critical, signal distortion can be a very serious problem.

Algebraic Interference Cancellation (AIC) avoids the distortion in the beam patterns that occurs with conventional ABF. Briefly, any signal incident at an M-element array presents at each sampling instant a vector of M complex numbers. Consider vectors s and i representing a signal of interest and interference incident at an array. In AIC, a matrix A is constructed such that Ai=0. Consequently, the following relationship holds true: A(i+s)=As. Although in eliminating the interference the signal is transformed, the transformation by A is known exactly and can be reversed.

AIC avoids the signal distortion problem inherent in ABF by employing an algebraic operation consisting of a matrix multiplication whose effect on the signal of interest can be reversed, yielding an undistorted signal output. This represents a significant advantage of AIC over ABF. The weakness in AIC is that the vector i, that is, the direction of the interference, must be known in order to calculate the aforementioned matrix A. More specifically, AIC is an open-loop scheme in which the interference directions are determined in a step that is separate and independent from eliminating them. Although there are numerous algorithms in existence that can be used to identify angular locations of interfering sources, it would be desirable if the adaptive techniques employed with ABF could be used with AIC.

SUMMARY

Described herein is a technique for determining the angles of arrival of signals incident on an antenna array, such as interference signals, using information generated from adaptive beam-forming (ABF) techniques. ABF techniques generate beam-forming "weights" which are typically used to weight the outputs of the antenna array elements to modify the antenna beam pattern, thereby maximizing the signal-to-interference ratio of a signal of interest at a particular angle by placing nulls in the antenna beam pattern in the directions of interferers. In the techniques described herein, these weights are used in a completely different manner to accurately determine the angles of arrivals of all discernible signals within an angular region of interest, including interference signals and possibly one or more signals of interest that are to be detected by the receiver.

More specifically, the outputs of the antenna array are supplied to a bank of weight generators, each operating in effect as a separate adaptive beam-forming sub-system designed to generate a set of weights that optimizes the signal-to-interference ratio for a signal at a particular look angle. That is, each weight generator is supplied with the antenna array outputs as well as a signal locally generated in the receiver which corresponds to a look angle for which the weight generator will optimize the weights to minimize interference. The different signal look angles used for the respective weight generators are selected to be outside the region of interest so that any signal (whether a signal of interest or interference) within the region of interest will be reflected in the computed weights.

An annihilation operator is determined from the sets of beam-forming weights generated by the weight generators and from beam-forming vectors representing the look angles. The annihilation operator is essentially a matrix that, when multiplied by a set of beam-forming vectors representing a range of angles within the region of interest, will produce a zero-magnitude vector at those angles that corresponds to angles of arrival of signals incident on the antenna array. By applying the annihilation operator in this manner, the angles of arrival of signals within the region of interest can be determined. The angles of arrival of those signals that are sources of interference can then be supplied, for example, to an algebraic interference cancellation (AIC) system to remove interference from the incoming signals received at the antenna array.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Described herein is a technique for determining the directions of signals arriving at an antenna array (i.e., "angles of incidence" or equivalently, "angles of arrival"), such as interference signals, by making use of the adaptive feature of adaptive beam-forming (ABF). In ABF, the adaptive component calculates a set of "weights," and the beam-forming process is implemented by forming an inner product between the weights and the array output vector. Information concerning the interference directions is contained within the weights, and in what follows a method for extracting this information is presented. One possible use of this information is within an AIC system, where the directions of interferers can be used to calculate the AIC annihilation operator A. It should be emphasized that the weights are used exclusively as a source of information, as described above, and not in any beam-forming capacity.

Figure 1:
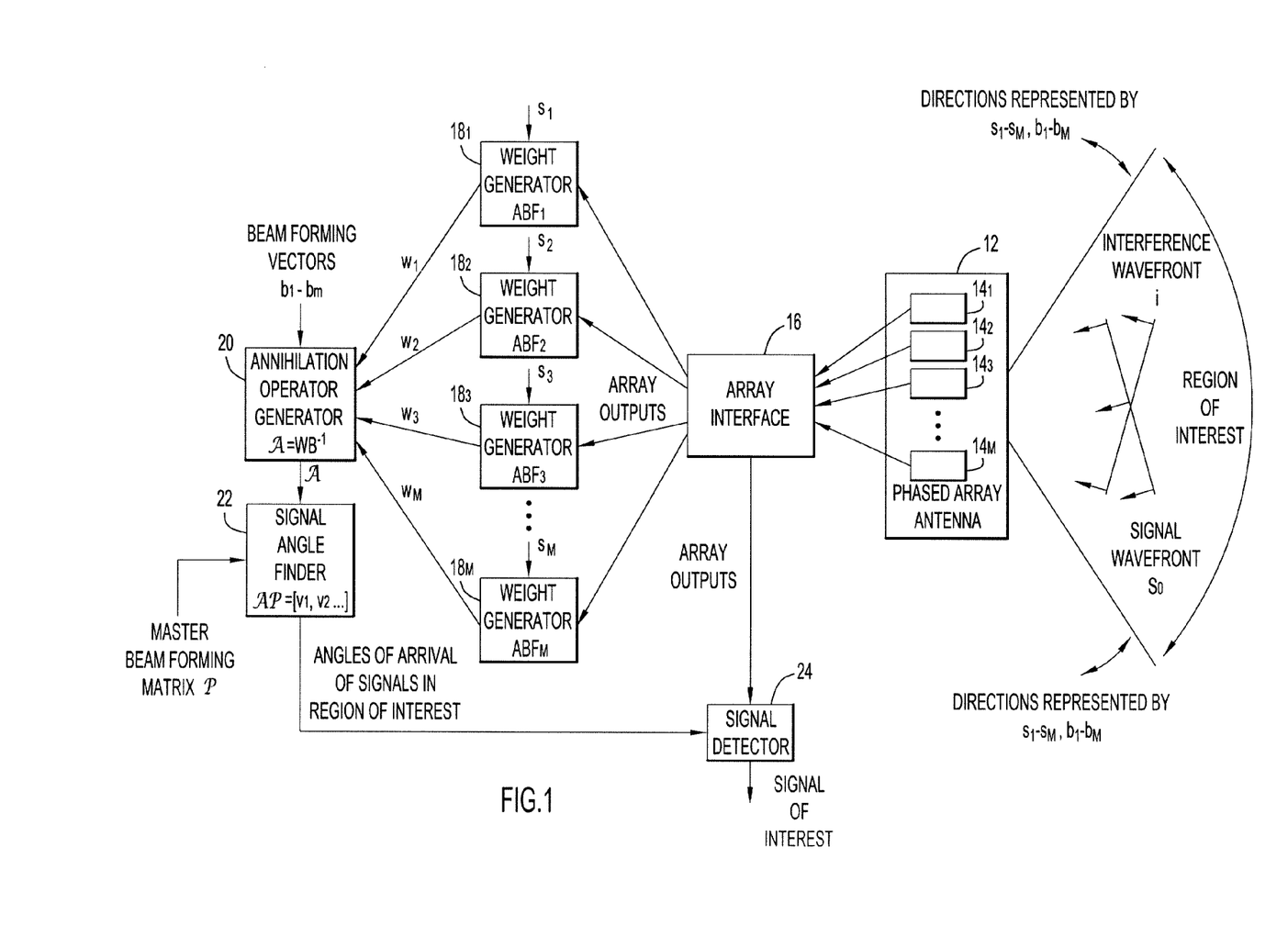
FIG. 1 is a block diagram illustrating a receiver system for determining angles of arrival of signals incident on an antenna array in accordance with an embodiment of the invention.
Figure 2:
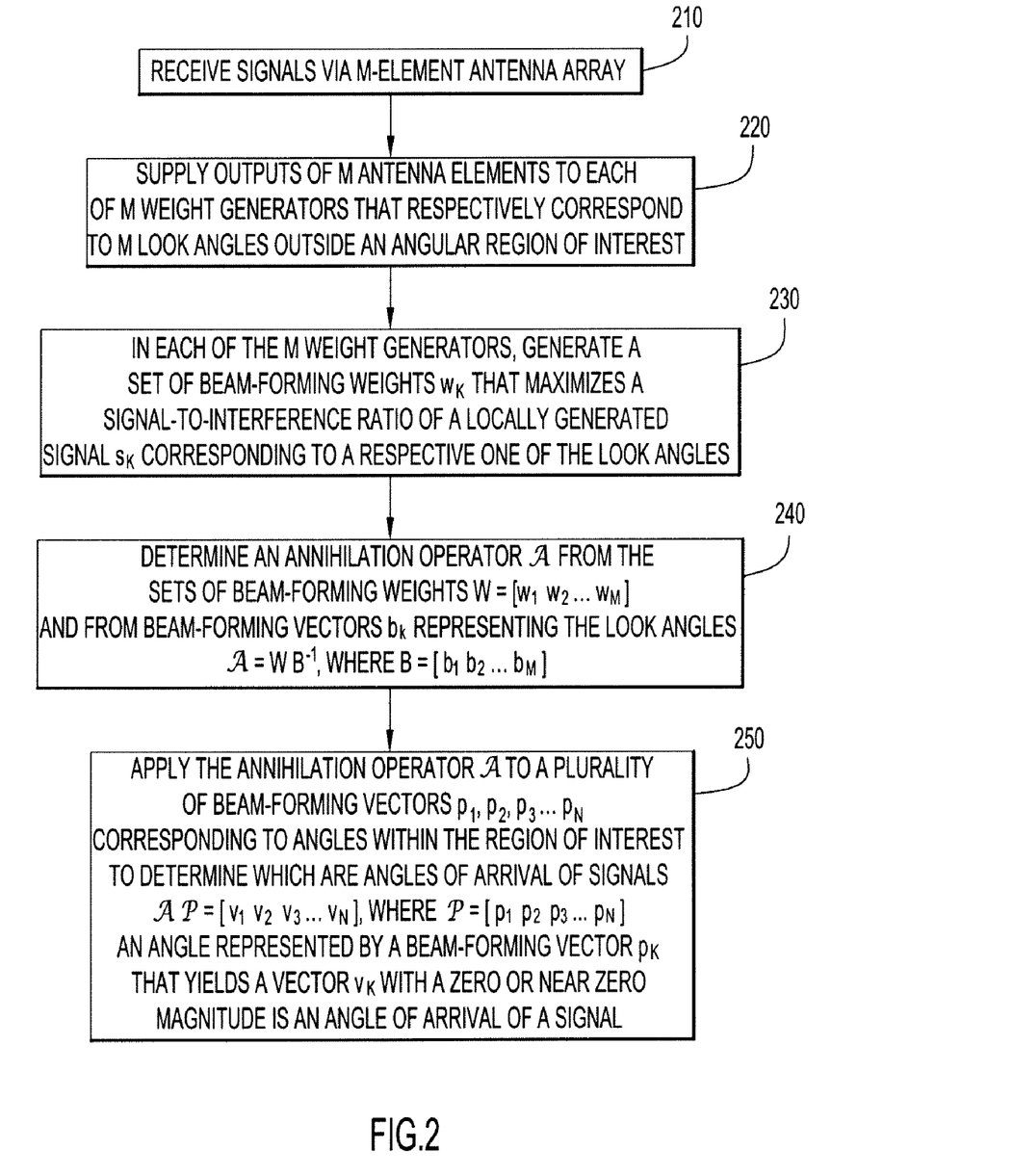
FIG. 2 is a functional flow diagram of operations performed to determine angles of arrival of signals incident on an antenna array in accordance with an embodiment of the invention.

FIG. 1 is a block diagram illustrating an embodiment of an adaptive system 10 for determining angles of arrival of signals incident on an M-element antenna array. The functional flow diagram shown in FIG. 2 summarizes the operations performed by the system of FIG. 1 to determine the angles of arrival of signals. The signals whose directions are determined may include one or more signals of interest as well as one or more interference signals. The system includes a phased array antenna 12, including a number of antenna array elements $14_1$, $14_2$, $14_3$, ... $14_m$. As shown in FIG. 1, the M-element antenna array is configured to receive signals over a region of interest (operation 210 in FIG. 2). In this example, the region of interest covers ±60° in azimuth relative to the antenna boresight, which is typical of a base station antenna for a cellular transmission system (e.g., three such antennas together provide 360° coverage). A region of interest specified by a single angular extent (e.g., specified only in azimuth) suggests a linear antenna array. However, the invention is not limited to systems involving linear antenna arrays and can be implemented with any type of antenna array, including a planar array, a circular array, etc. In such cases, the region of interest would typically be specified by more than one angular extent (e.g., in both azimuth and elevation).

At any given moment, signals from within the region of interest may be incident on the antenna array, including interference signals and possibly one or more signals of interest. For purposes of illustration, in FIG. 1, the wavefront of a signal of interest $s_o$ and the wavefront of an interferer signal i are shown arriving at the antenna array at two different angles of incidence (angles of arrival). Thus, in this example, the outputs of the array elements include components from the signal of interest $s_o$ and the interference signal i.

An array interface 16 receives the signals from each of the array elements $14_k$ and supplies the outputs of the array to each of M independent adaptive weight generator sub-systems $18_1$, $18_2$, $18_3$, ..., $18_m$ (operation 220 in FIG. 2). The number of weight generator sub-systems 18 (or simply "weight generators") is equal to the number M of antenna elements 14 in the array. Weight generators 18 operate in parallel, and each weight generator $18_k$ is designed to treat both the signal of interest $s_o$ and the interference signal i, as well as any other signals within the region of interest, as interference. Each weight generator $18_k$ essentially operates like a separate adaptive beam-forming (ABF) system to generate a set of beam-forming weights $w_k$ that maximizes the signal-to-interference ratio of a signal at a particular look angle. More specifically, a set of M look angle directions $d_k$, k=1 to M, are selected, and each weight generator $18_k$ is assigned and constrained to one of the look angle directions. As shown in FIG. 1, the look angle directions are selected to be outside the region of interest. Each weight generator $18_k$ is supplied with a "virtual" signal $s_k$ that is locally generated in the receiver and corresponds to the look angle direction $d_k$ of the weight generator $18_k$. Each signal $s_k$ is constructed such that it is a replica of what the array output would be for a sine wave incident at the array from the direction $d_k$.

In operation 230 in the flow diagram of FIG. 2, each of the M weight generators $18_k$ uses adaptive beam-forming to generate a set of beam-forming weights $w_k$ that maximizes a signal-to-interference ratio of its respective, locally-generated virtual signal $s_k$ corresponding to a respective one of the look angles. The technique makes use of the adaptive component of ABF systems for determining angles of arrival of interfering sources. In general, these adaptive beam-forming systems (i.e., the weight generators 18) operate under the condition that a particular direction of interest, a look angle, is specified. Given the look angle, these systems adaptively maximize the signal-to-interference ratio for possible signals coming from this specified direction. That is, all radiation coming from directions other than the look angle direction are treated as interference, which the system attempts to minimize. The essential idea is to cause each weight generator $18_k$ to consider the virtual signal $s_k$ supplied to it as the signal of interest.

A number of adaptive beam-forming algorithms are currently available that are applicable to a variety of different situations. One such algorithm which is suitable for use in the technique described herein is the constrained least-mean-square algorithm (CLMSA). This algorithm yields an optimal solution for the beam-forming weights under the condition that the look angle is fixed and corresponds to the direction of an actual signal of interest, which imposes a constraint on the adaptive process in the generation of the weights. Nevertheless, any of a variety of other adaptive algorithms for generating beam-forming weights can also be used, and the invention is not limited to any particular ABF algorithm.

With the foregoing in mind, each weight generator $18_k$ attempts to maximize the signal-to-interference ratio of the locally-generated virtual signal $s_k$ supplied to it by generating ABF weights that place nulls in the antenna beam pattern in directions of other signals. For example, each weight generator $18_k$ can implement a separate, independent CLSMA ABF system in parallel with the other weight generators 18. Thus, the set of weights $w_k$ generated via the ABF process by each weight generator $18_k$ inherently contains information about the angle of arrival of signals from directions other than the selected look angle $d_k$, such as signals $s_o$ and i arriving at angles from within the region of interest and contained within the antenna array outputs. Each set of weights will do the same thing, namely, eliminate any signal arriving from within the region of interest. However, while all of the weight generators 18 are operating on the same array output signals, since each weight generator $18_k$ is maximizing a signal $s_k$ at a different look angle $d_k$, the set of weights $w_k$ will be different for each weight generator $18_k$.

It is noted that, the weight generators described here operate under extremely benign conditions, unlike what a typical ABF system would actually experience in the field. The "virtual" signals of interest $s_k$ can be constructed as pure, essentially noiseless, sine waves with exactly-known angular locations. Since the signals $s_k$ are not actual array outputs resulting from a wave front incident at the array, but, as noted, are replicas generated in the receiver, their amplitudes can be made arbitrarily large with no increase in the noise level, which will be established by the front-end array amplifiers. In this application of an adaptive beam-forming algorithm, such as CLMSA, the weight generators can be operated with an arbitrarily large signal-to-noise ratio (SNR), which further idealizes the conditions under which the weights are generated.

In operation, the virtual signals $s_k$ can be generated in any of a variety of ways, depending on the particular receiver architecture. For example, an actual physical signal can be generated within the receiver (e.g., using a local oscillator) and supplied to the weight generators (e.g., at RF, IF, etc.). Another option is to generate a digital representation of a signal (e.g., generating a stream of digital "samples"). Another option is to merely represent the signals mathematically as a replica of what would have been received had a signal arrived from a particular angle.

Selecting look angles $d_1$-$d_m$ that are in the excluded region (i.e., outside the region of interest) for the locally-generated virtual signals $s_1$-$s_m$ operated on respectively by weight generators $18_1$-$18_m$ avoids the potential problem of one or more of the look angles being placed near or at the same angle as one of the signals within the region of interest whose angle of incidence is being determined. In this example, the look angles of each signal $s_k$ can lie between ±60°-90°. If the look angle of one of the weight generators happens to be placed in the same direction as an arriving signal, the weights generated by that weight generator would not reflect the presence of the arriving signal and thus the weights would not contribute to the determination of the angle of incidence of the arriving signal using the technique described herein.

In applying the adaptive beam-forming algorithm, the weight generators will adaptively converge to a set of elements or weights, $w_1, w_2, w_3, \ldots, w_m$. Each set of weights $w_k$ contains M weights and can be expressed as an M×1 vector. As shown in FIG. 1, these weight vectors $w_k$ are supplied to an annihilation operator generator 20 along with a set of beam-forming vectors $b_1, b_2, b_3, \ldots, b_M$ for the M specified directions, $d_k$, k=1 to M. If $b_1, b_2, b_3, \ldots, b_M$ are the ordinary beam-forming vectors for the M specified directions, then, as is shown below, the weight vectors w will ideally and optimally all be of the form $w_k = \mathcal{A} b_k$, k=1 to M, where $\mathcal{A}$ is the annihilation operator or its equivalent for all radiation incident at the array; that is, including the signal of interest $s_o$ as well as the interference signal i in this example. Note that while the annihilation operator $\mathcal{A}$ described herein is similar to the annihilation operator A used in algebraic interference cancellation (AIC), the annihilation operator $\mathcal{A}$ fundamentally differs from the AIC annihilation operator A in that the AIC annihilation operator A operates to eliminate only interference arriving from pre-determined directions, whereas the annihilation operator $\mathcal{A}$ is derived from virtual signals outside the region of interest and eliminates all signals arriving at the antenna from within the region of interest, including interference signal and any discernable signal of interest, by transforming such signals into the zero vector.

The annihilation operator $\mathcal{A}$ is dependent, in this example, only on the angular locations of the signal of interest $s_o$ and the interference signal i and is not a function of k. Accordingly, the M×1 weight vectors $w_k$ from weight generators 18 can be jointly expressed as an M×M matrix W=[$w_1$ $w_2$ $w_3$ ... $w_m$]. The weight matrix W is square, because there are as many weights as elements in the array, and there are as many weight generators 18 as elements in the array. Similarly, the M×1 beam-forming vectors $b_1, b_2, b_3, \ldots, b_m$ for the M specified directions can be expressed as an M×M matrix B=[$b_1$ $b_2$ $b_3$ ... $b_m$]. Therefore, $$\mathcal{A}_{[b_1 b_2 b_3 \ldots b_m]} = \mathcal{A} B = [w_1 w_2 w_3 \ldots w_m] = W \qquad (1)$$

Since each column of the beam-forming matrix B represents a different angle the beam-forming vectors $b_1$ are linearly independent. Consequently, the beam-forming matrix B has an inverse matrix $B^{-1}$. Hence, $$\mathcal{A} = W B^{-1} \qquad (2)$$

Thus, as indicated in operation 240 in the flow diagram of FIG. 2, the annihilation operator $\mathcal{A}$ is determined from the sets of weights W and from the beam-forming vectors $b_k$ representing the look angles, in the form of the inverse matrix $B^{-1}$. It is noted again that the only function of the weights W is to be a source of information concerning the interference directions. They play no part in the actual interference-rejection process or beam-forming.

Thus, an AIC-like annihilation operator $\mathcal{A}$ has been constructed with the use of adaptive beam-forming techniques. As shown in FIG. 1, this annihilation operator $\mathcal{A}$ is supplied from annihilation operator generator 20 to a signal angle finder 22. To extract the desired information from the annihilation operator $\mathcal{A}$, a master beam-forming matrix $\mathcal{P}$, which is supplied to signal angle finder 22, is defined as a rectangular structure with a number of rows equal to the number of array elements M and a number of columns N, each column representing a trial angle of incidence as a beam steering vector p of the form $$\begin{bmatrix} e^{-i\phi_1} \\ e^{-i\phi_2} \\ \vdots \\ e^{-i\phi_M} \end{bmatrix} \qquad (3)$$

where the $\Phi_k$ are the phases at the elements that would be in place for a wave incident from the direction corresponding to that column, and N is the number of trial angles, where $\mathcal{P} = [p_1\ p_2\ p_3\ \ldots\ p_N]$. Each trial angle beam-forming vector $p_j$, j=1 to N, represents an angle of incidence within the region of interest from which a signal or interference may have arrived. The beam-forming vectors p are essentially of the same form as the beam-forming vectors b representing the look angles of the "virtual" signals respectively operated on by the weight generators. However, the vectors p correspond to "trial" directions within the region of interest, each of which will be investigated to determine if it corresponds to the direction of an arriving signal. Applying the annihilation operator $\mathcal{A}$ to the master beam-forming matrix P consisting of these trial angle beam-forming vectors p essentially enables the information about the directions of the signals within the region of interest to be extracted from the annihilation operator $\mathcal{A}$.

If the master beam-forming matrix $\mathcal{P}$ is constructed with enough columns (i.e., trial angle beam-forming vectors p) such that the angular granularity is fine enough, the directions and the column vectors corresponding to the signal of interest $s_o$ and the interference signal i (in this example) will be represented somewhere in the columns of $\mathcal{P}$. To determine exactly where, in accordance with operation 250 shown in FIG. 2, the following matrix product is formed $$\mathcal{A} \mathcal{P} = [v_1 v_2 v_3 \ldots v_N] \qquad (4)$$

where the vectors $v_j$, j=1 to N, are column vectors with the number of rows equal to the number of array elements M. As described above, in this example, the columns corresponding to the directions of the signal of interest $s_o$ and the interference signal i will contain the zero vector. In other words, the annihilation operator $\mathcal{A}$ is applied to a plurality of trial beam-forming vectors $p_1, p_2, p_3, \ldots, p_N$ corresponding to angles within the region of interest to determine which are angles of arrival of signals, and any angle represented by a beam-forming vector $p_j$ that yields a vector $v_j$ with a zero or near zero magnitude is an angle of arrival of a signal, such as $s_o$ or i. For example, the master beam-forming matrix $\mathcal{P}$ can consist of 121 column vectors p which respectively correspond to angles at one-degree increments from $-60°$ to $+60°$ within a $\pm 60°$ region of interest (e.g., $-60°, -59°, \ldots, -1°, 0°, 1°, \ldots, 59°, 60°$). The columns that produce a zero result are the angles at which signals are located.

At each angle represented by a beam-forming vector $p_j$, the result of this operation is a column vector $v_j$. To more easily identify the columns vectors $v_j$ having a magnitude that is zero or close to zero (and which therefore correspond to the angles for $s_o$ and i), the string of inner products can be formed, resulting in a function of scalars that represent the length (magnitude) of the vectors:

$$V = [v_1^H v_1 v_2^H v_2 v_3^H v_3 \ldots v_N^H v_N] \quad (5)$$

To identify the angular location of signals within the region of interest, each of the scalar values in equation (5) can be compared to a threshold set slightly above zero. Those values falling below the threshold correspond to angles at which signals were received, as reflected in the antenna array outputs. As used herein the term "near zero" refers to a vector's magnitude that is sufficiently close to zero that the angular direction of the vector can be safely be assumed to be that of an actual signal with an acceptably low probability of false alarm and/or an acceptably high probability of detection. The particular value of the threshold that delineates what is sufficiently "near" zero will of course be a function of the particular architecture and operating requirements of the receiver system in which the technique is used.

Optionally, depending on computing resources and timing requirements, computing of the vector products and the magnitudes of the vector products can be performed repeatedly with different angular spacings between the angles represented by the beam-forming vectors (e.g., a coarse spacing followed by a fine spacing). For example, at initial spacing of one degree between adjacent beam-forming vectors p can be used, as described above, to perform a coarse search for signals within the region of interest. Once the angles whose vectors have the smallest magnitudes have been identified, a fine search can be conducted in the angular vicinity of these angles using adjacent beam-forming vectors p that are more closely spaced (e.g., with one-tenth of a degree between adjacent beam-forming vectors) in order to refine the determination of the angle of arrival of the signals. This process can be repeated a certain number of times with selected spacings and/or until the magnitudes of the "zero" vectors are below a certain threshold.

While weight generators 18, annihilation operator generator 20, and signal angle finder 22 are illustrated as separate function blocks in FIG. 1 for purposes of description, it will be appreciated that the operations performed within these blocks can be performed in any combination of hardware and/or software and need not be performed via separate modules, equipment, or software (e.g., all of the computations can be performed by running software on a processor). The technique described herein can be performed as a continual process which operates on the array outputs on an ongoing basis, and the determination of the angles of arrival of signals within the region of interest changes as the directions of the signals change relative to the orientation of the antenna array.

Referring again to FIG. 1, once the angles of arrival of the signals in the region of interest are determined, they can be supplied to a signal detector 24 along with the array outputs from the array interface in order to eliminate interference from the array outputs prior to detecting the signal of interest. This can be accomplished, for example, by using the determined angles of arrival of interferers in an algebraic interference cancellation (AIC) process to eliminate interference. With an array of M elements and M weight generators, the maximum number of signals whose angle of arrival can be determined by the technique described herein is M−1. In the case where one of those M−1 signals is the signal of interest to the receiver, then the directions of a maximum of M−2 interference signals can be identified.

The process described above does not inherently reveal which of the signals is interference and which is a signal of interest. In many cases, the direction of the signal of interest is known. If the signal's angular location is known, the interference locations are of course immediately identified. If not, that is, if at the outset it is not known whether an identified signal such as $s_o$ or i is the actual signal of interest, some form of testing will be required to distinguish signal from interference. A wide variety of techniques for identifying a signal as a signal of interest is known, and the details of such techniques would be specific to the particular nature of the signal waveform and/or the architecture of the receiver/detector, which is beyond the scope of this description. There are also known ways of determining whether a signal constitutes interference. For example, in many contexts, a wideband signal can be assumed to be interference (e.g., jamming signals are generally wideband). In some instances, the nature of the signal of interest itself may make such determinations unnecessary. For example, in systems that employ direct sequence spread spectrum signals, such as CDMA wireless or GPS, the signals are typically below the level of noise. Consequently, the technique described herein will not "see" the signal, i.e., the annihilation operator will not identify the angle of arrival of the spread spectrum signal as one of the "zero" vector angles within the region of interest. Consequently, in this case, any signals identified within the region of interest can be assumed to be interference.

Returning now to equation (2), the existence of the inverse matrix $B^{-1}$ requires that the look angle directions $d_k$ be chosen such that the corresponding beam-forming vectors $b_k$ are linearly independent. This issue has been discussed in the literature, and conditions for linear independence have been defined. In this case, however, there is also another constraint on the directions $d_k$, namely, that they must not correspond to the directions of any interfering sources, which of course are unknown apriori. These issues heretofore have not been addressed fully. In order to demonstrate the effectiveness of this approach, results of computer experiments are presented in which observations from angles in the vicinity of end fire are excluded, and the directions $d_k$ are selected from the range of excluded angles (i.e., outside the region of interest), as described above.

An example of the use of this approach is now presented. In order to more fully demonstrate its effectiveness, a nine-element array (M=9) was considered. The nine directions $d_k$ were chosen to be $-90°, -82°, -73°, -61°, 65°, 67°, 70°, 79°,$ and $88°$, restricting the viewing angles to essentially $+60°$. With this choice of the directions $d_k$, the rank of B was six, rank deficient by three.

Figure 3:
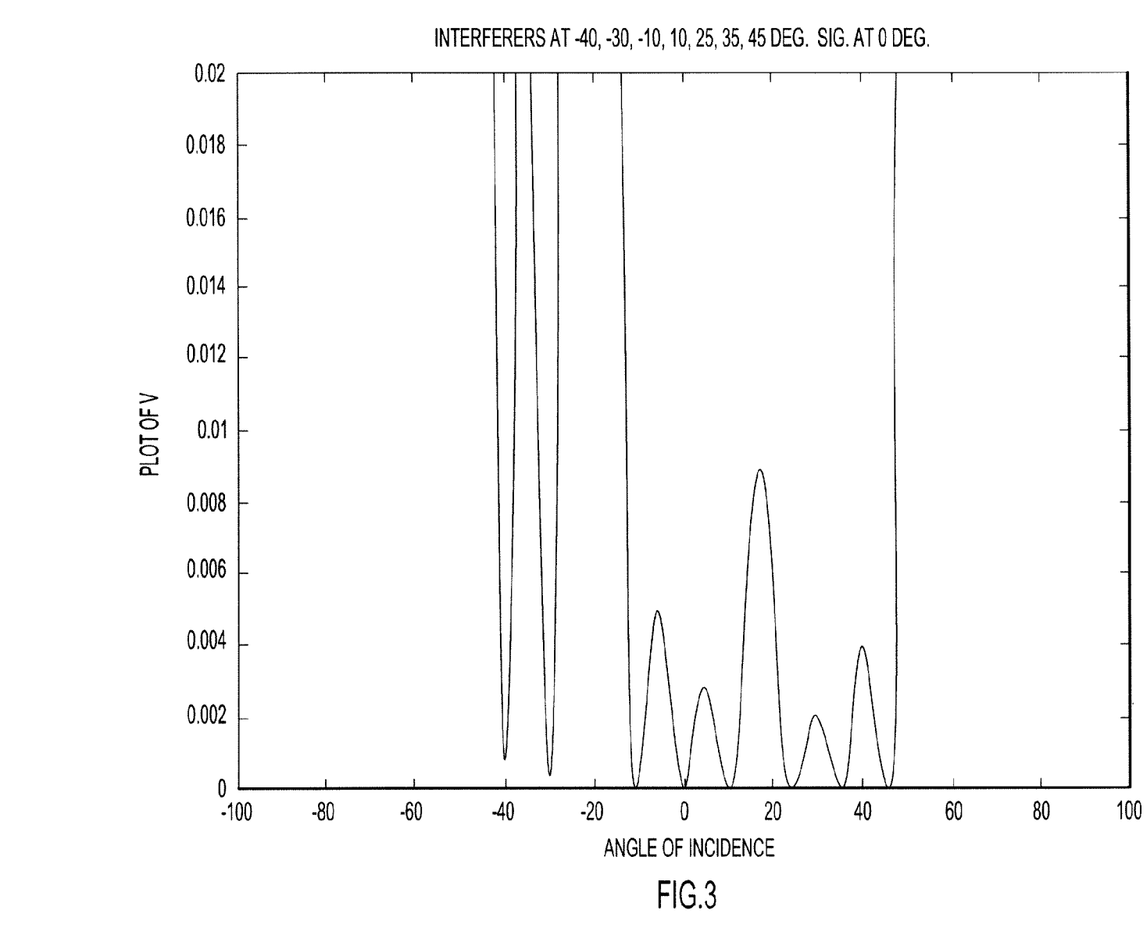
FIG. 3 is a graph of the magnitude of a product vector v resulting from applying an annihilation operator to a range of beam-forming vectors over a region of interest, where magnitudes near zero indicate locations of angles of arrival of signals within the region of interest.

In this demonstration, there were seven interferers at $-40°, -30°, -10°, 10°, 25°, 35°,$ and $45°$, with the signal of interest at 0°. FIG. 3 shows the plot of the string of inner products V, (Eq. (5)) versus angle. The locations of the interference and the signal are precisely and unambiguously indicated.

As noted, front-end amplifier noise in AIC can result in errors in the weight calculations, and, as discussed, such errors are expected to be minimal. Once the location of the signal of interest has been determined from among the zeros of the function V in equation (5), the interference locations are of course identified and the AIC annihilation operator A can be calculated and applied using the angles of only the interferers.

As can be seen from these results, even a somewhat arbitrarily-conditioned matrix B yields very satisfactory results. Furthermore, the problem of avoiding the interference directions in the choices of the $d_k$ can be circumvented by dividing the viewing space into separate segments as demonstrated in the foregoing example.

It is now shown that, in general, $w_k = Ab_k$ as stated above. For every matrix S there are vectors u such that $Su=0$. This set of vectors u is called the Null Space of S. A well-known theorem from linear algebra states that for any arbitrary vector x, the vector $y=Sx$ is orthogonal to the null space of S. That is, for any arbitrary x, $(y,u)=0$, where y and u are as just described and $(y,u)$ is the dot product or inner product of the two vectors. In other words, the operation Sx projects x into a space that is orthogonal to the null space of S.

This is applied here as follows. By constructing A such that $Ai=0$, a matrix is constructed whose null space consists of the set of interference vectors incident at the array. It has been shown that for any signal $s_k$ and associated beam-forming vector $b_k$, the optimum weight vector $w_k$ is the projection of $b_k$ in a space orthogonal to the space of the interference vectors. Hence, since for arbitrary x, the vector $y=Ax$ is orthogonal to the interference vectors, the weight vector $w_k=Ab_k$ is orthogonal to the interference and optimum. As discussed above, the ABF weight generator systems here operate under extremely benign, ideal conditions for yielding ideal optimal sets of weights due to the local generation of the "virtual" signal of interest $s_k$.

The technique described herein can be applied in all systems that are currently being used for rejecting interference at arrays. Essentially all such systems currently in use employ ABF, which unavoidably introduces distortion into the signals of interest. AIC provides a means for avoiding signal distortion, but requires knowledge of the interference directions. This invention provides a means of dealing with this requirement and for achieving practical implementation of adaptive AIC. As an especially attractive feature, this scheme could be introduced to existing systems with minimal fundamental alteration of the existing system front ends, since almost all are adaptive. Since there is an enormous number of deployed arrays which employ anti jam processors for eliminating interference, there is potential for a very wide application of the invention.

It is important to understand that the invention described herein involves a technique for determining angles of arrival of signals and does not require this information to be used subsequently in any specific manner or for any specific purpose. Thus, while this technique can be used to supply useful information to an (AIC) system for removing interference from a received signal, the invention is not limited merely to use of the technique with an AIC system. More generally, the information about angles of arrival of signals determined by the described technique can be used in any of a wide variety of contexts in which such information would be beneficial, including other types of interference removal systems.

Having described preferred embodiments of new and improved methods and apparatus for determining the angles of arrival of signals incident on an antenna array, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method for determining the angles of arrival of signals incident on an antenna array from directions within an angular region of interest, the method comprising:
    supplying outputs of antenna elements of the antenna array to each of a plurality of weight generators that respectively correspond to a plurality of look angles outside the region of interest;
    generating, in each of the weight generators, a set of beam-forming weights that maximizes a signal-to-interference ratio of a locally-generated signal corresponding to a respective one of the look angles;
    determining an annihilation operator from the sets of beam-forming weights generated by the weight generators and from beam-forming vectors representing the look angles; and
    applying the annihilation operator to a plurality of beam-forming vectors representing angles within the region of interest to determine angles of arrival of signals within the region of interest.

2. The method of claim 1, wherein the antenna array includes M antenna elements and the outputs of the antenna elements are supplied to M weight generators, each associated with one of the look angles, where M is an integer greater than 1.

3. The method of claim 1, wherein determining the annihilation operator includes:
    forming a weight matrix W whose columns comprise the weight vectors from the weight generators;
    computing an inverse matrix $B^{-1}$ of a beam-forming matrix B whose columns comprise the beam-forming vectors representing the look angles; and
    computing the annihilation operator $\mathcal{A}$ as a product of the weight matrix W and the matrix $B^{-1}$.

4. The method of claim 1, wherein determining the angles of arrival of signals within the region of interest includes:
    computing vector products of the annihilation operator and the beam-forming vectors representing angles within the region of interest; and
    computing magnitudes of the vector products, wherein angles within the region of interest represented by beam-forming vectors that yield vector products with a magnitude near zero are determined to be angles of arrival of signals within the region of interest.

5. The method of claim 4, wherein computing the vector products and the magnitudes of the vector products are performed repeatedly with different angular spacings between the angles represented by the beam-forming vectors.

6. The method of claim 4, further comprising:
    computing the magnitudes of the vector products for a first set of beam-forming vectors representing a first set of angles within the region of interest; and
    computing the magnitudes of the vector products for a second set of beam-forming vectors representing a second set of angles within the region of interest, wherein the second set of angles are more closely spaced than the first set of angles and are selected to be in a vicinity of angles from the first set of angles whose beam-forming vectors yielded vector products with smallest magnitudes.

7. The method of claim 1, further comprising:

determining which, if any, of the signals incident on the antenna array is a signal of interest and treating the remaining signals incident on the antenna array as interference signals;

using the beam-forming vectors of the interference signals to perform algebraic interference cancellation (AIC) on the outputs of the antenna elements; and detecting the signal of interest from AIC-adjusted outputs of the antenna elements.

8. An apparatus for determining the angles of arrival of signals incident on an antenna array from directions within an angular region of interest, comprising:

a plurality of weight generators each configured to receive outputs of antenna elements of the antenna array and to generate a set of beam-forming weights that maximizes a signal-to-interference ratio of a locally generated signal corresponding to a respective look angle outside the region of interest;

an annihilation operator generator configured to generate an annihilation operator from the sets of beam-forming weights generated by the weight generators and from beam-forming vectors representing look angles of the locally generated signals respectively supplied to the weight generators; and a signal angle finder configured to apply the annihilation operator to a plurality of beam-forming vectors representing angles within the region of interest to determine angles of arrival of signals within the region of interest.

9. The apparatus of claim 8, wherein the antenna array includes M antenna elements and the apparatus includes M weight generators, each associated with a respective look angle outside the region of interest, where M is an integer greater than 1.

10. The apparatus of claim 8, wherein the annihilation operator generator is configured to: form a weight matrix W whose columns comprise the weight vectors from the weight generators; form an inverse matrix $B^{-1}$ of a beam-forming matrix B whose columns comprise the beam-forming vectors representing the look angles; and compute the annihilation operator $\mathcal{A}$ as a product of the weight matrix W and the matrix $B^{-1}$.

11. The apparatus of claim 8, wherein signal angle finder is configured to compute vector products of the annihilation operator and the beam-forming vectors representing angles within the region of interest and to compute magnitudes of the vector products, wherein angles within the region of interest represented by beam-forming vectors that yield vector products with a magnitude near zero are determined to be angles of arrival of signals within the region of interest.

12. The apparatus of claim 11, wherein the signal angle finder is configured to compute the vector products and the magnitudes of the vector products repeatedly with different angular spacings between the angles represented by the beam-forming vectors.

13. The apparatus of claim 11, wherein the signal angle finder is configured to:

compute the magnitudes of the vector products for a first set of beam-forming vectors representing a first set of angles within the region of interest; and compute the magnitudes of the vector products for a second set of beam-forming vectors representing a second set of angles within the region of interest, wherein the second set of angles are more closely spaced than the first set of angles and are selected to be in a vicinity of angles from the first set of angles whose beam-forming vectors yielded vector products with smallest magnitudes.

14. The apparatus of claim 8, further comprising:

a signal detector configured to determine which, if any, of the signals in the region of interest is a signal of interest and treating the remaining signals in the region of interest as interference signals;

using the beam-forming vectors of the interference signals to perform algebraic interference cancellation (AIC) on the outputs of the antenna elements; and detecting the signal of interest from AIC-adjusted outputs of the antenna elements.

15. A computer readable non-transitory medium storing instructions, that when executed by a computer, cause the computer to determine the angles of arrival of signals incident on an antenna array from directions within an angular region of interest by performing the functions of:

supplying outputs of antenna elements of the antenna array to each of a plurality of weight generators that respectively correspond to a plurality of look angles outside the region of interest;

generating, in each of the weight generators, a set of beam-forming weights that maximizes a signal-to-interference ratio of a locally-generated signal corresponding to a respective one of the look angles;

determining an annihilation operator from the sets of beam-forming weights generated by the weight generators and from beam-forming vectors representing the look angles; and applying the annihilation operator to a plurality of beam-forming vectors representing angles within the region of interest to determine angles of arrival of signals within the region of interest.

16. The computer readable non-transitory medium of claim 15, storing further instructions, that when executed by a computer, cause the computer to determine the annihilation operator by performing the further functions of:

forming a weight matrix W whose columns comprise the weight vectors from the weight generators;

computing an inverse or matrix $B^{-1}$ of a beam-forming matrix B whose columns comprise the beam-forming vectors representing the look angles; and computing the annihilation operator $\mathcal{A}$ as a product of the weight matrix W and the matrix $B^{-1}$.

17. The computer readable non-transitory medium of claim 15, storing further instructions, that when executed by a computer, cause the computer to apply the annihilation operator by performing the further functions of:

computing vector products of the annihilation operator and the beam-forming vectors representing angles within the region of interest; and computing magnitudes of the vector products, wherein angles within the region of interest represented by beam-forming vectors that yield vector products with a magnitude near zero are determined to be angles of arrival of signals within the region of interest.

18. An apparatus for determining the angles of arrival of signals incident on an antenna array from directions within an angular region of interest, comprising:

means for generating a plurality of sets of beam-forming weights that maximizes a signal-to-interference ratio of a respective plurality of locally generated signals corresponding to respective look angles outside the region of interest based on outputs of antenna elements of the antenna array;

means for generating an annihilation operator from the sets of beam-forming weights and from beam-forming vectors representing the look angles of the locally generated signals; and means for applying the annihilation operator to a plurality of beam-forming vectors representing angles within the region of interest to determine angles of arrival of signals within the region of interest.

19. The apparatus of claim 18, wherein the means for generating the annihilation operator: forms a weight matrix W whose columns comprise the weight vectors, forms an inverse matrix $B^{-1}$ of a beam-forming matrix B whose columns comprise the beam-forming vectors representing the look angles, and computes the annihilation operator $\mathcal{A}$ as a product of the weight matrix W and the matrix $B^{-1}$.

20. The apparatus of claim 18, wherein means for applying the annihilation operator computes vector products of the annihilation operator and the beam-forming vectors representing angles within the region of interest, and computes magnitudes of the vector products, wherein angles within the region of interest represented by beam-forming vectors that yield vector products with a magnitude near zero are determined to be angles of arrival of signals within the region of interest.

* * * * *